US006000027A

United States Patent [19]

Pawate et al.

[11] Patent Number: 6,000,027

[45] **Date of Patent: *Dec. 7, 1999**

[54] METHOD AND APPARATUS FOR IMPROVED GRAPHICS/IMAGE PROCESSING USING A PROCESSOR AND A MEMORY

[75] Inventors: Basavaraj I. Pawate, Dallas; Betty Prince, Sugar Land, both of Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 07/934,982

[22] Filed: Aug. 25, 1992

[51] Int. Cl.[6] .......... G06F 15/00

[52] U.S. Cl. .......... 712/39; 345/519

[58] Field of Search .......... 395/800, 425, 395/500–544; 345/185, 519, 520, 521, 522, 507; 712/32, 36, 38, 39, 43; 708/231; 710/129; 711/1, 104, 100, 101

[56] References Cited

U.S. PATENT DOCUMENTS

| | | | |
|---|---|---|---|
| 4,654,789 | 3/1987 | Nusinov et al. | 395/500.44 |
| 4,731,737 | 3/1988 | Witt et al. | 710/129 |
| 5,088,023 | 2/1992 | Nakamura et al. | 711/103 |
| 5,293,468 | 3/1994 | Nye et al. | 345/431 |

OTHER PUBLICATIONS

Nicoud, "Video RAMS: Structure and Applications", Feb. 1988, IEEE Micro, pp. 8–27.

Tom Goodman, "Application–Specific RAM Architectures Attack New Applications," Wescon Conference Proceedings, 1986, pp. 1–5.

Steve Z. Szirom, "Intelligent Memories Promise Product and Market Niches," Wescon Conference Proceedings, 1989, pp. 24–28.

C. Y. Lee, Intercommunicating Cells, Basis for a Distributed Logic Computer, Proceedings—Fall Joint Computer Conference, 1962, pp. 130–136.

C. Y. Lee, et al., "A Content Addressable Distributed Logic Memory with Applications to Information Retrieval," *Proceedings of the IEEE*, 1963, pp. 924–932.

Chat–Yu Lam, et al., "The Intelligent Memory System Architecture–13 Research Directions," *Department of Defense, Defense Technical Information Center*, 1979, pp. 1–36.

I. Aleksander, "Intelligent Memories and the Silicon Chip," *IEE Electronics & Power*, 1980, pp. 324–326.

Stephen Walters, "Memories with Internal Logic Cut External Circuit Needs," *EDN*, 1981, pp. 239–244.

Roderic Beresford, "Smart Memories Seek Honors in Proliferating Small Systems," *Electronics*, 1982, pp. 89–98.

Gary Wood, "Intelligent Memory Systems Can Operate Nonstop," *Electronic Design*, 1982, pp. 243–250.

P. Corsini, et al., Intelligent Memory Subsystem Supporting Memory Virtualisation, *Electronics Letters*, 1983, pp. 265–266.

Karl Goser, et al., "Intelligent Memories in VLSI," *Information Sciences* 34, 1984, pp. 61–82.

Cecil Kaplinsky, et al., "Memory Controller Gives a Microprocessor a Big Mini's Throughput," *Electronic Design*, 1984, pp. 153–164.

(List continued on next page.)

*Primary Examiner*—John A. Follansbee
*Attorney, Agent, or Firm*—W. Daniels Swayze, Jr.; Wade James Brady, III; Richard L. Donaldson

[57] ABSTRACT

A smart video memory (10) is provided that includes data storage (12 and 18), a serial access memory (19), and a processing core (14 and 16) for executing instructions stored in the data storage area (12 and 18). Externally, smart memory (10) is directly accessible as a standard video memory device.

3 Claims, 3 Drawing Sheets

OTHER PUBLICATIONS

M. Andrews, et al., "Concurrency and Parallelism—Future of Computing," *Super Computing ACM*, 1985, pp. 224–230.

Hartmut Schrenk, "Novel Chip Card Concept with the SLE 4401 K Intelligent Memory," *Telecom Report 9* (1986) No. 3, 1986, pp. 172–176.

Robert Grondalski, et al., Session XVI: Microprocessors–Special Purpose THPM 16.3: A VLSI Chip Set for a Massively Parallel Architecture, IEEE International Solid––State Circuits Conference, Feb., 1987, pp. 198, 199, 399, 400.

S. J. Bailey, "Intelligent Memories Strengthen Bonds between Central/Distributed Control," *Control Engineering*, Jun., 1987, pp. 69–73.

Ron Wilson, et al., "Intelligent Memory Architectures Attack Real–World Computation," *Computer Design*, Jun., 1988, pp. 28–30.

A. F. Johnson, "Busting Imaging Barriers with a Mac II," *ESD: The Electronic System Design Magazine*, Jul., 1988, pp. 79–82.

Masood Namjoo, et al., "Implementing SPARC: A High–Performance 32–Bit RISC Microprocessor," *Sun Technology*, Winter, 1988, pp. 42–48.

Abhaya Asthana, et al., "Impact of Advanced VLSI Packaging on the Design of a Large Parallel Computer," 1989 International Conference on Parallel Processing, 1989, pp. I–323—I–327.

Patrice Bertin, et al., "Introduction to Programmable Active Memories," *Digital Paris Research Laboratory*, Jun., 1989, pp. 1–9.

Dik Lun Lee, et al., "HYTREM—A Hybrid Text–Retrieval Machine for Large Databases," *IEEE Transactions on Computers*, Jan., 1990, pp. 111–123.

Don Speck, "The Mosiac Fast 512K Scalable CMOS dRAM," *Advanced Research in VLSI 1991; UC Santa Cruz*, 1991, pp. 229–244.

Alex Mendelsohn, "Will Monolithic or Multichip Processors Win the Performance Race?," *Computer Design*, May, 1991, pp. 100–110.

Randy Groves, "Design Decisions and Technology That Were Keys to Success of RISC System/6000," *Computer Design*, May, 1991, pp. 112–114.

Gideon Intrater, "How High–Ended Embedded Processors Are Changing," *Computer Design*, May, 1991, pp. 116–121.

FIG. 3a (PRIOR ART)
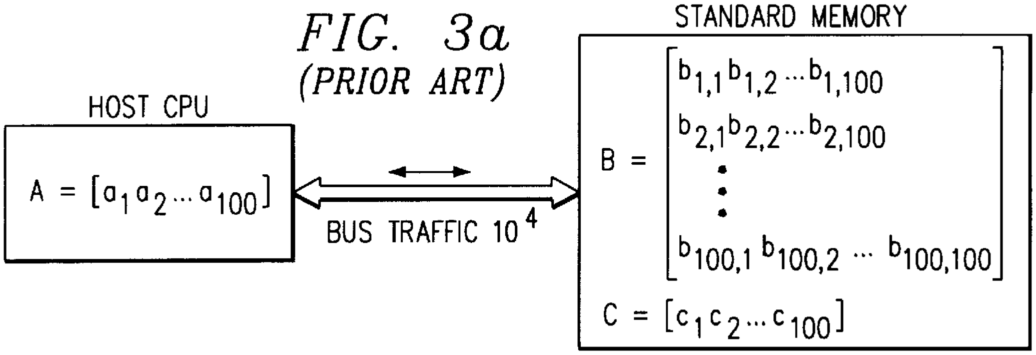
FIG. 3b
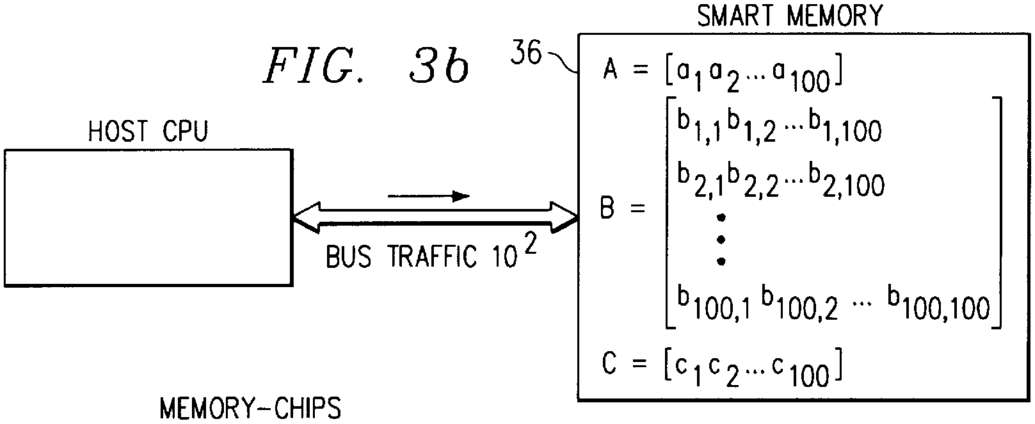
FIG. 4
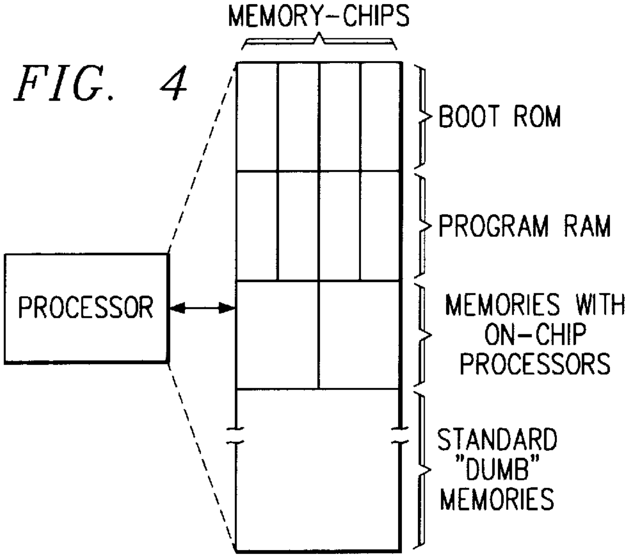
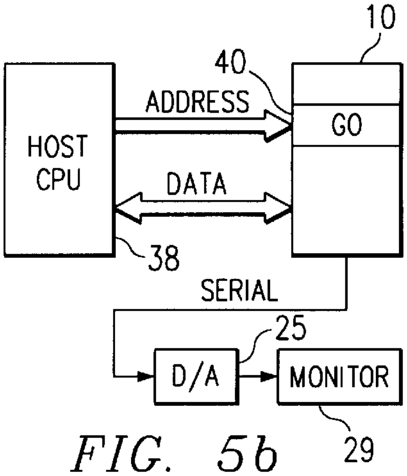
FIG. 5b
FIG. 5a
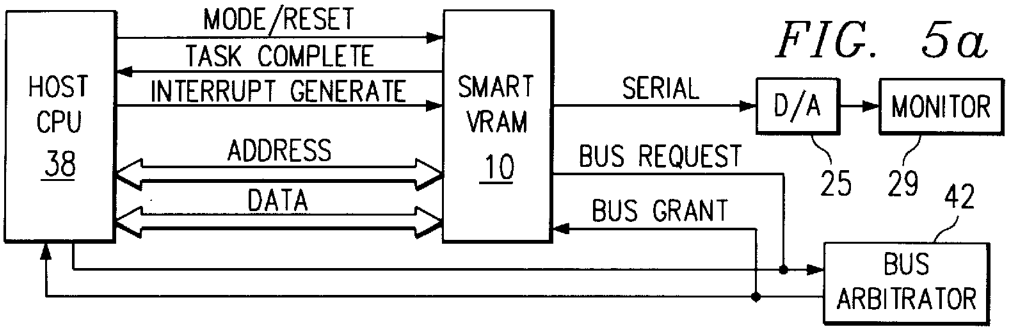

METHOD AND APPARATUS FOR IMPROVED GRAPHICS/IMAGE PROCESSING USING A PROCESSOR AND A MEMORY

RELATED APPLICATIONS

This application relates to U.S. patent application Ser. No. 08/324,291, filed Oct. 17, 1994, (attorney docket TI-16770) entitled "Method and Apparatus for Improved Graphics Processing," now U.S. Pat. No. 5,678,021.

TECHNICAL FIELD OF THE INVENTION

This invention relates generally to processing, and more particularly to a method and apparatus for improved graphics/image processing.

BACKGROUND OF THE INVENTION

Advances in processor technology have allowed for significant increases in processing speed. However, in applications that are intensive in off-processor chip memory accesses, such as speech, signal, and image processing applications, the gain in raw processing speed is often lost because of relatively slow access times to the off-chip memories. This problem is further aggravated since memory technology has focused on increased device density. With increased device density, the maximum bandwidth of a system decreases because multiple bus architectures are defeated. For example, a graphics application requiring storage of a 480×240 sixteen-bit image has four times the bandwidth if eight 256K memory chips are used, rather than two of the more dense 1 megabyte chips.

Several strategies have been proposed to overcome these difficulties. One such solution involves using an application specific integrated circuit ("ASIC") to offload time-intensive tasks from the host CPU to increase overall system throughput. This alternative, however, requires one ASIC for each function to be offloaded, and requires dedicated memory for each ASIC. Consequently, a higher overall system cost is involved, and the system throughput is increased only for those tasks for which the ASIC was designed to handle, and not for tasks in general.

Another alternative involves the use of a co-processor. Such a solution allows for tasks to be offloaded from a host CPU and allows system memory to be shared by both the host CPU and the co-processor. With this system, however, total system bandwidth is decreased because of arbitration between the host processor and the co-processor. Furthermore, well-developed software is required to make full use and provide for "seamless integration" of the co-processor.

Another alternative involves the use of an application specific processor for offloading tasks from a host CPU. This alternative may require an expensive dedicated static RAM ("SRAM") for use by the application specific processor. Thus, this alternative involves increased system cost. Furthermore, the SRAM is not available even when the attached application specific processor is idle, and well-developed software is needed for "seamless integration".

As another solution to these difficulties, significant research and effort has been directed towards multiprocessing systems for increasing throughput as the limits of decreasing processor cycle times are approached. However, difficulties in designing multiprocessing systems, developing communication protocols for such systems, and designing software support routines have deterred proliferation of multiprocessing systems. Nonetheless, many applications in signal, speech and image processing are structured and lend themselves to partitioning and parallel processing.

These problems present themselves in many environments, and a particular area in which incrased processor to memory bandwidth is critical is graphics and imaging processing, since significant amounts of memory and associated data processing are required.

Thus, a need has arisen for a device and method allowing for execution of several self-contained graphics and imaging tasks in parallel within existing architectural frameworks. Furthermore, a need has arisen for improving processor to memory bandwidth in graphics and imaging applications without significant cost increases and without requiring customized, specific solutions for increasing system throughput.

SUMMARY OF THE INVENTION

In accordance with the present invention, an improved method and apparatus for graphics and imaging processing is provided. In particular, data is stored in a data storage of a smart video memory. Within the smart video memory, a processing core is operable to execute instructions stored in the storage area and to read and write data stored in that storage. External connections to the smart video memory are arranged such that the smart video memory appears as a standard video memory device to external devices.

An important technical advantage of the present invention is the fact that system throughput can be increased through use of the present invention, since it allows for parallel processing.

Another important technical advantage of the present invention is the fact that existing systems can be easily upgraded through use of the present invention because it appears externally as a standard video memory device. Because the present invention appears externally as a standard video memory device, parallel processing can be more easily implemented.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 3*a* is a block diagram illustrating bus traffic with a standard memory device;

FIG. 3*b* is a block diagram illustrating bus traffic in a system employing a device constructed according to the teachings of the present invention;

FIG. 4 is a block diagram of a memory map of a system including a device constructed according to the teachings of the present invention;

FIG. 5*a* is a block diagram illustrating processor control signals according to the present invention; and FIG. 5*b* is a block diagram illustrating processor startup of a device constructed according to the teachings of the present invention.

DETAILED DESCRIPTION OF THE INVENTION

The problems discussed in the background of the invention are addressed with the present invention by integrating a processor into a large video random access memory ("VRAM") in a single integrated circuit. Throughout this description, a device constructed according to the teachings of the present invention will be referred to, from time to time, as a smart video memory or a smart VRAM (video random access memory). These terms are used because a device constructed according to the teachings of the present invention appears externally as a random access video memory chip and may have the pinout of a dynamic random access video memory chip.

Figure 1A:
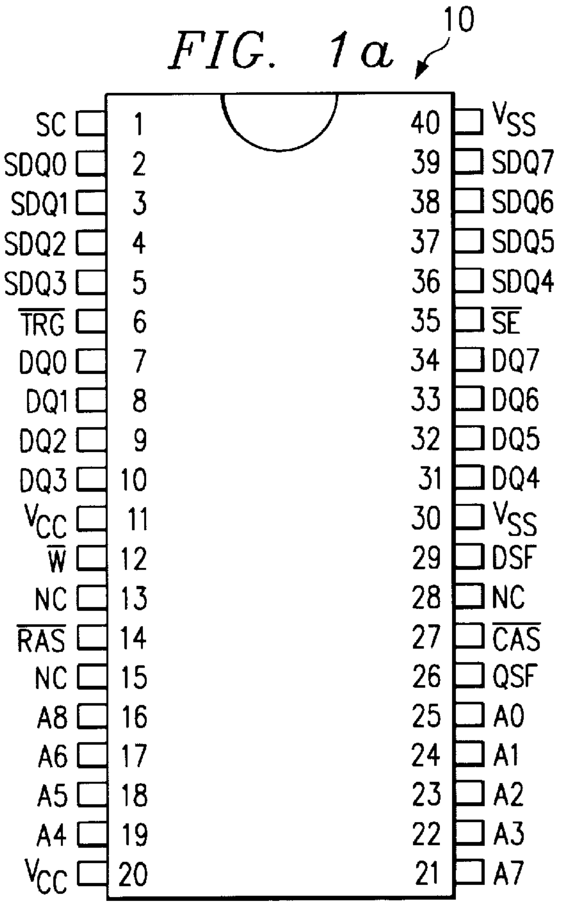
FIG. 1*a* illustrates an external view of a device constructed according to the present invention.
Figure 1B:
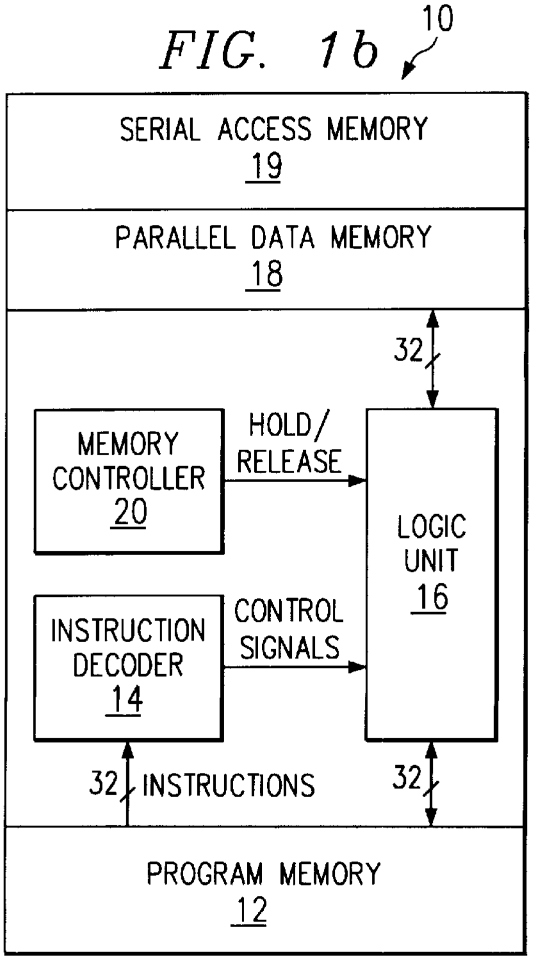
FIG. 1*b* is a block diagram of an internal view of a device constructed according to the teachings of the present invention.

FIGS. 1*a* and 1*b* present external and internal views of a smart VRAM in accordance with the present invention. As shown in FIG. 1*a*, externally, a device 10 constructed according to the teachings of the present invention appears as a standard video memory device with a memory-like pinout, such as that of a TMS48C121 multiport video RAM, made by Texas Instruments Incorporated. Device 10 may have a pinout arrangement that is the same or substantially the same as standard video memory pinouts, or Device 10 may have a pinout arrangement that includes a standard video memory pinout plus additional pins, as will be discussed below. In either case the pins are to be arranged such that the Device 10 is directly accessible as a standard video memory device by external devices.

Device 10 includes, by way of example, 40 pins which provide equivalent inputs and outputs of a typical VRAM. Device 10 may also include other pins in addition to those of a standard video memory device, for additional functionality, as will be discussed below. It should be understood that the pinout illustrated in FIG. 1*a* is for example only, and the pinout of Device 10 may be arranged to correspond to any standard video memory pinout, and as discussed, may include pins in addition to those of standard video memories. A host CPU, such as an Intel 386 microprocessor, may access the device 10 as it would access a standard video memory device.

In a particular embodiment, a smart VRAM constructed according to the teachings of the present invention may have a pinout as shown in FIG. 1*a*. The following table provides the pin, or lead, nomenclature for the pinout as shown in FIG. 1.

Pin Nomenclature

| | Standard Mode | Smart Mode |
|---|---|---|
| A0–A8 | Address Inputs | Address inputs |
| CAS | Column Enable | Column Enable |
| DQ0–DQ7 | DRAM Data In-Out/ Write Mask Bit | DRAM Data In-Out/ Write Mask Bit |
| SE | Serial Enable | Serial Enable |
| RAS | Row enable | Row enable |
| SC | Serial Data Clock | Serial Data Clock |
| SDQ0–SDQ7 | Serial Data In-Out | Serial Data In-Out |
| TRG | Transfer Register/ Q Output Enable | Transfer Register/ Q Output Enable |
| W | Write Mask Select/ Write Enable | Write Mask Select/ Write Enable |
| DSF | Special function select | Special function select |
| OSF | Split-register Activity Status | Split-register Activity Status |
| Vcc | 5-V Supply (TYP) | 5-V Supply (TyP) |
| Vss | Ground | Ground |
| M/RESET | No care | Mode/Reset |
| TC | No care | Task completion |
| IG | No care | Interrupt Generate |

As shown in the table above, for a particular embodiment of the present invention, the device has 40 pins identical to a "standard" 132K by 8-bit VRAM device, with the three no-care pins used for special functions of the present invention, to be discussed. In a particular embodiment, the internal bus is 32 bits wide. The on-board processor has a 30-ns instruction cycle time, and the chip operates on a 5-V power supply. The on-board processor can also be powered and grounded through additional pins, or the standard power and ground pins. It should be understood that the above specifications are for a particular embodiment, and other specifications may be used without departing from the intended scope of the present invention. For example, a wider bus than 32 bits, such as a 64 bit or 128 bit wide internal bus may be used.

As shown in the block diagram of FIG. 1*b*, internally device 10 appears like a processor with a large on-chip video memory. In the illustrated embodiment, program and data reside in partitioned data storage, although program and data may reside in the same memory space of the data storage without departing from the intended scope of the present invention. A wide internal bus, inherently available inside memory devices, connects the processor with the memory. As shown in FIG. 1*b*, the internal bus may be 32 bits wide. The program memory 12 is coupled to instruction decoder 14. Instruction decoder 14 decodes instructions residing within program memory 12 and outputs control signals to a logic unit 16. Logic unit 16 is also coupled to program memory 12 and to data memory 18. Data memory 18 is also coupled to serial access memory ("SAM") 19.

Instruction decoder 14 and logic unit 16 represent the processor core integrated into a memory according to the present invention. Processor cores to be integrated may range from fairly limited processor cores, such as those including only an integer unit, to those including both fixed point and floating point multipliers. For example, a RISC-based integer unit (such as SPARC or MIPS) may be included as the processor core in the present invention. Typically, such integer units would occupy less than 10 percent of the area of a 16-Mbit VRAM. Thus, RISC cores are attractive for integration because of their relatively small size compared to other processor cores. Processor cores using hardware multipliers in addition to the integer unit may also be included. For example, a digital signal processor core, such as those used in the Texas Instruments TMS320C10-C50 digital signal processors may be integrated into smart memories according to the present invention.

As discussed above, program memory 12 and data memory 18 may occupy the same memory space or may be separately partitioned. Furthermore, these memories are parallel access memories and may comprise dynamic random access memories. A memory controller 20 is also coupled to logic unit 16. Memory controller 20 is used to ensure that external accesses to the memory of device 10 have priority over internal accesses. Thus, memory controller 20 freezes logic unit 16 during external accesses and then releases the logic unit 16 to resume processor execution after completion of the external access. External devices will have the highest memory access priority. Thus, for example, if a host processor tries to access the on-chip memory of a device constructed according to the teachings of the present invention while it is processing, then the on-chip processor will be halted.

Serial access memory 19 provides for serial access to memory 18. In the embodiment shown in FIG. 1*a*, serial access memory 19 comprises eight SAM registers, with each of these registers coupled to one of the serial I/O leads, SDQ0–SDQ7. Each of these registers are, for example, 256 bits wide. Serial access to memory 18 is obtained via SAM 19. In a particular embodiment, each of the serial access memory registers is coupled to each of the columns of memory 18, such that a selected row of memory 18 will be read from or written to one of the SAM registers, and serially through that SAM register's serial I/O lead.

Figure 2A:
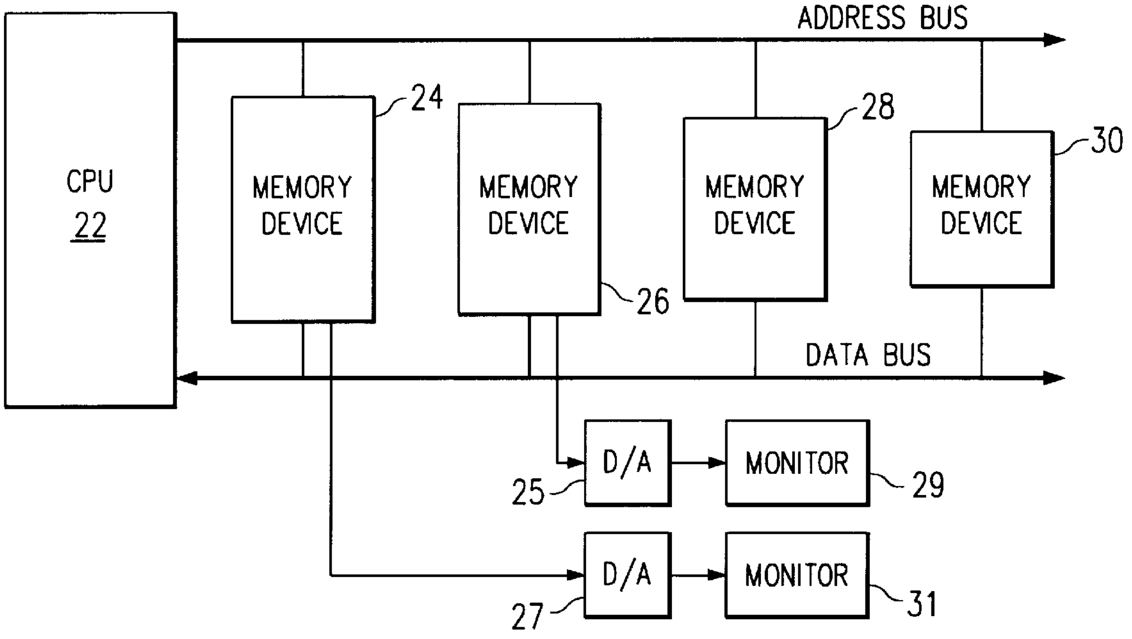
FIG. 2a (PRIOR ART)
FIG. 2*a* is a block diagram of a typical uniprocessor system with standard memory devices.

FIG. 2*a* is a block diagram of a prior art uniprocessor system with two standard memory devices and two standard VRAMs. As shown in FIG. 2*a*, the CPU 22 operates to store and retrieve data from the memory devices 24, 26, 28, and 30 through the use of an address and data bus. As an example, CPU 22 may comprise a TMS 320 made by Texas Instruments Incorporated, while memory devices 24 and 26 may comprise 132K×8 bit VRAMs, and devices 28 and 30 may comprise 32K×8 RAMs. VRAMs 24 and 26 are coupled to digital to analog converters 25 and 27, respectively, which are coupled to monitors 29 and 31, respectively. These D/A converters and monitors allow for video display of the data within VRAMs 24 and 26.

Figure 2B:
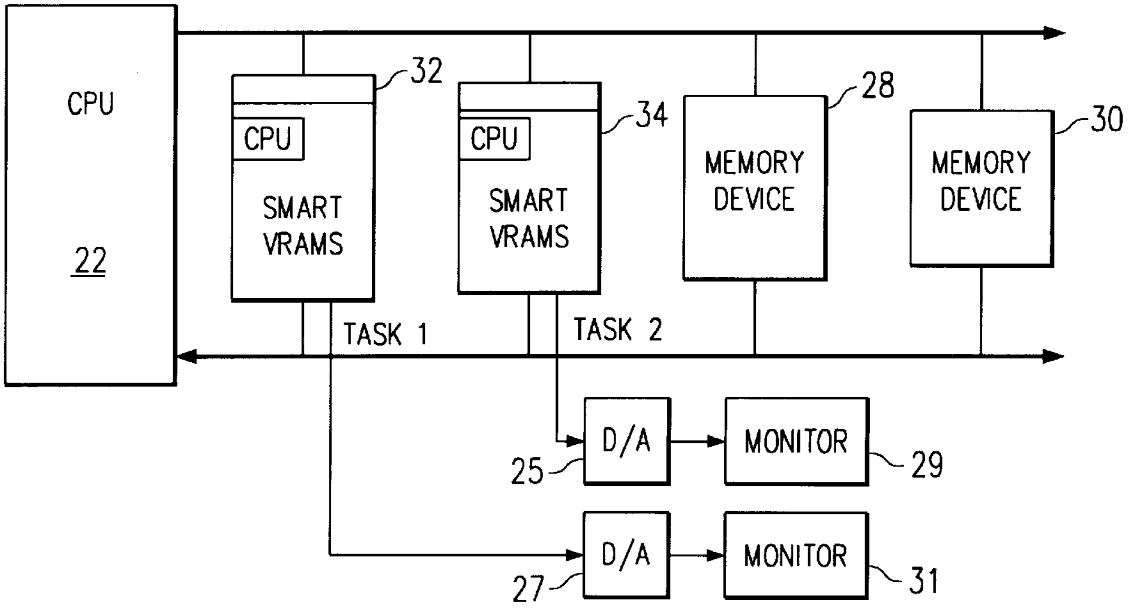
FIG. 2*b* is a block diagram of a system including devices constructed according to the teachings of the present invention.

FIG. 2*b* illustrates a system including two smart VRAMs 32 and 34 as shown in FIGS. 1*a* and 1*b*. As can be seen from FIGS. 2*a* and 2*b*, the standard memory devices shown in FIG. 2*a* have been replaced by devices constructed according to the teachings of the present invention without the need for additional hardware. Smart VRAMs 32 and 34 appear as typical video memory devices, and thus are connected as if they were such memory devices. Thus, such smart video memories can convert an existing uniprocessor system, such as a personal computer, into a powerful multiprocessor system without major system redesign. As shown in FIG. 2*b*, the two smart video memory devices may be used to execute tasks in parallel with operations performed by the CPU.

Because of the design of the present invention, significant advantages are realized to systems including smart memories. One such advantage is system throughput. System throughput increases because of the simultaneous execution of several self-contained tasks. For example, in a personal computer environment, one smart video memory may be executing a graphics application downloaded by a host CPU and preparing that data for output to a graphics display, while another smart video memory may be executing another downloaded graphics application on an image stored within that smart VRAM. These tasks are performed through the control of a controlling CPU. With the tasks distributed among the smart video memories as described above, the only task for the central CPU would be to move the data to and from the smart video memories, without having to perform any processing on the data within those smart memories.

Another advantage of the present invention is improved CPU to memory bandwidth. Instead of fetching raw data from the memory, processing that data, and writing the processed results back to the memory, the host CPU now fetches only the processed data or information from the memory. Traffic on the system bus is therefore reduced. FIGS. 3*a* and 3*b* illustrate an example of reduced traffic due to use of a smart VRAM constructed according to the teachings of the present invention. In certain graphics applications, vectors must often be multiplied by various matrices. For example, a vector A may be multiplied by a matrix B to result in a vector C. As shown in FIG. 3*a*, in a conventional prior art system a host CPU fetches the elements of matrix B (raw data), multiplies them with the elements of vector A, and writes the products back to memory. With a system using a smart VRAM constructed according to the teachings of the present invention, the CPU moves the elements of vector A to the smart memory 36 containing matrix B, and the smart memory 36 then calculates C by multiplying A and B, thus freeing the host CPU from this vector multiplication. For a vector size of 100 and the above example, the traffic on the system bus is reduced by a factor of 100 when a smart VRAM constructed according to the teachings of the present invention is used.

Another advantage of the present invention is that it can serve two separate functions. In the default mode, devices according to the present invention serve as standard video memory devices. However, as will be discussed below, they can also be switched into a "smart" mode and made to execute specific tasks by downloading appropriate software. In contrast, coprocessor cards in current computers physically occupy a slot. When idle, their dedicated memory is not available to the host CPU.

The present invention also allows ease of upgrading functionality in existing systems. Designing memory subsystems and adding them to existing processor systems is easier than designing and adding processor subsystems. Today's memories are standardized components, in stark contrast to processors, and thus devices constructed according to the teachings of the present invention, because they are pin-compatible with memory chips, may be easily integrated into existing systems. Furthermore, since the address space of a processor is typically populated with several memory devices, each time a smart VRAM is added to a system, not only is additional memory added, but also additional processing capability. Thus, as the computational needs of a system grow, the system can be easily and quickly scaled up by adding smart VRAMs constructed according to the teachings of the present invention. FIG. 4 illustrates a typical processor and memory system and its inherently parallel structure. Thus, smart video memories designed according to the present invention provide for parallel processing with minimum design change, since they can be added to systems just as standard memory devices are.

Another advantage of the present invention is increased processing rates because of the locality of the memory and wide internal bus structure. Since all of the data needed for a program being executed on a smart VRAM are on-chip, the processing speed is faster than if the data were off-chip. Furthermore, wide internal busses are more feasible inside a memory chip than across chip boundaries because of size and electrical characteristic considerations.

In a preferred approach, the present invention has two modes, "smart" and "standard". In the "smart" mode, the processor core is enabled to process data in the data memory 18, if instructed to begin processing. In the "standard" mode, the processing core is prevented from processing. The default operating mode is the "standard" mode. In the "standard" mode, the device operates as a standard video memory device. As shown in FIG. 5*a*, the host processor 38 of the system dynamically switches the operating mode by writing to a mode pin of the smart video memory 10. The mode pin may comprise a no care pin on a typical video memory device such as pin 13 in FIG. 1*a*. By using a mode pin, the operating mode of the device is guaranteed, and software bugs cannot inadvertently switch the mode. In another alternative, the mode pin could be used as an extra address pin. Thus, when addressed in one particular range, the smart video memory would function in the standard mode. When addressed in another range, it would function in the smart mode.

In another embodiment, the mode of a smart video memory device could be switched without the use of a mode pin. With this approach, a fixed memory location is allocated as an operating mode switch. For example, a particular location within data memory 18 of FIG. 1*b* can be reserved as a mode switch. The host processor can switch operating modes by addressing and writing fixed patterns to this memory location across address and data busses as shown in FIG. 5*a*. The smart processor senses the pattern, or sequence of patterns, and switches modes accordingly. Other alternatives for selecting the mode of the device that do not require an extra pin like a mode pin include write-per-bit type functions or other design-for-test ("DFT") functions.

The mode pin can also be used as a reset pin. Because a smart VRAM according to the present invention includes a processor, a reset function for the processor is needed. This reset can be accomplished through the mode pin—every time the mode is switched to "smart," a reset takes place. As an alternative embodiment, an additional reset pin can be used. Furthermore, the reset function may be accomplished without the use of pin signals, but by writing patterns to particular memory locations within the smart VRAM across address and data busses as shown in FIG. 5*a*, as discussed in connection with the mode switch. The reset function could be associated with the same memory location as the mode switch, or a separate memory location. FIG. 5*a* illustrates the reset pin in combination with the mode pin.

Once in the "smart" mode, the host processor may start and stop the processor on the smart VRAM by writing fixed patterns to a fixed "go" location as shown in FIG. 5*b*. If not in the "smart" mode, then the processor on the smart VRAM cannot begin processing, even if the "go" instruction has been received. A host CPU 38 addresses the go memory location 40 of smart VRAM 10 and writes the fixed "go" pattern to that location. The processor on the smart video memory device will then begin to execute, provided the device is in the smart mode. After the smart video memory has completed its task, it can signal the processor of its task completion through the TC pin. The TC pin, as shown in the above table and FIG. 5*a*, may comprise a no care pin of a standard memory device such as pin 15 in FIG. 1*a*. This TC pin may be connected to the interrupt line of a host CPU. It should be understood that the TC pin need not be used to signal task completion. For example, a particular memory location could be reserved as a status memory location within the smart VRAM. The host processor could poll this status memory location for a particular code indicating that a task has been completed by the smart VRAM through use of the address and data busses as shown in FIG. 5*a*. As another approach, the smart VRAM could have a reserved memory location for an estimate of the length of time required for completion of its task. The host CPU could read this memory location and then request the processed data after the estimated length of time has elapsed.

As shown in the preceding table and FIG. 5*a*, an interrupt generate signal is also provided. This signal may be accomplished through a pin such as a no care pin or an additional pin, or, as discussed in connection with the mode switch, through a "soft" signal, by writing appropriate codes to particular memory locations across address and data busses shown in FIG. 5*a*. The interrupt generate signal causes the processor of the smart VRAM to interrupt its current task and process an interrupt task. Upon completion of the interrupt task, the initial task is resumed. The ID or address of the interrupt task can be passed by the host processor along with the interrupt generate signal.

As shown in FIG. 5*a*, a serial data lead of smart VRAM 10 is coupled to monitor 29 through D/A 25. With this setup, video data is displayed on monitor 29 from the smart VRAM 10. The video data is serially output through the SAM 19 across a serial data lead.

For additional processing abilities, smart VRAM 10 may include bus request and bus grant signals, for use in connection with a bus arbitrator 42 as shown in FIG. 5*a*. With this capability, smart VRAM 10 can directly take control of the address and parallel data system bus to perform, for example, I/O functions, to provide for more complete parallel processing.

The data read from and written to the parallel DRAM memory of a smart VRAM by a host CPU is performed conventionally. The host CPU writes input data to the DRAM of the smart VRAM and reads data conventionally. If an 8-bit wide external bus is used with a 16-bit host CPU, for example, the processor will have to make two reads and writes to accomplish 16-bit data transfers.

Although the present invention has been described in detail, it should be understood the various changes, substitutions and alterations can be made without departing from the spirit and scope of the invention as defined solely by the appended claims.

What is claimed is:

1. A smart video memory, comprising:

data storage including a random access memory and a serial access memory;

a processor to execute instructions stored in said data storage and to read and write data in said data storage, said data storage and processor integrated in a single integrated circuit;

external leads coupled to said data storage and processor and extending from said single integrated circuit for externally connecting an external device to said data storage and processor, said external leads arranged such that the smart video memory is directly accessible as a standard video memory device by said external device while the processor is prevented from executing the instructions; and at least one of said external leads comprising a serial data lead coupled to said serial access memory for serial data access, wherein one of said external leads comprises a mode lead for switching said processor between a smart mode and standard mode.

2. A smart video memory, comprising:

data storage including a random access memory and a serial access memory;

a processor to execute instructions stored in said data storage and to read and write data in said data storage, said data storage and processor integrated in a single integrated circuit;

external leads coupled to said data storage and processor and extending from said single integrated circuit for externally connecting an external device to said data storage and processor, said external leads arranged such that the smart video memory is directly accessible as a standard video memory device by said external device while the processor is prevented from executing the instructions; and at least one of said external leads comprising a serial data lead coupled to said serial access memory for serial data access, wherein said data storage includes a predetermined memory location for storing mode information for switching said processor between a smart mode and a standard mode.

3. A smart video memory, comprising:

data storage including a random access memory and a serial access memory;

a processor to execute instructions stored in said data storage and to read and write data in said data storage, said data storage and processor integrated in a single integrated circuit;

external leads coupled to said data storage and processor and extending from said single integrated circuit for externally connecting an external device to said data storage and processor, said external leads arranged such that the smart video memory is directly accessible as a standard video memory device by said external device while the processor is prevented from executing the instructions; and at least one of said external leads comprising a serial data lead coupled to said serial access memory for serial data access, wherein said data storage includes a predetermined memory location for storing information for causing said processor to start and stop executing instructions.

* * * * *